United States Patent [19]

White et al.

[11] 4,153,901
[45] May 8, 1979

[54] VARIABLE FREQUENCY MULTI-ORIFICE IJP

[75] Inventors: John T. White, Grand Prairie; Kenneth T. Lovelady, Irving, both of Tex.

[73] Assignee: Recognition Equipment Incorporated, Irving, Tex.

[21] Appl. No.: 861,155

[22] Filed: Dec. 16, 1977

Related U.S. Application Data

[63] Continuation of Ser. No. 752,769, Dec. 20, 1976, abandoned.

[51] Int. Cl.² ............................................. G01D 15/18
[52] U.S. Cl. .................................. 346/75; 346/140 R
[58] Field of Search ................................... 346/75, 140

[56] References Cited

U.S. PATENT DOCUMENTS

| | | | |
|---|---|---|---|
| 3,683,396 | 8/1972 | Keur et al. | 346/75 X |
| 4,068,144 | 1/1978 | Toye | 346/75 X |

OTHER PUBLICATIONS

Krause, K. A., Focusing Ink Jet Head, IBM Technical Disclosure Bulletin, vol. 16, No. 4, Sep. 1973, p. 1168.
Fowler, R. L., Ink Jet Copier Nozzle Array, IBM Technical Disclosure Bulletin, vol. 16, No. 4, Sep. 1973, pp. 1251-1253.

Primary Examiner—George H. Miller, Jr.
Attorney, Agent, or Firm—John E. Vandigriff

[57] ABSTRACT

A hemicylindrical crystal is used in a variable frequency multi-orifice ink jet modulator. Unwanted resonant frequencies are damped providing the capability of wide band operation. A phase control is used with the modulator to control printing operations.

2 Claims, 5 Drawing Figures

VARIABLE FREQUENCY MULTI-ORIFICE IJP

This is a continuation of application Ser. No. 752,769, filed Dec. 20, 1976, now abandoned.

FIELD OF INVENTION

This invention relates to ink jet printers and more particularly to a multi-frequency multi-orifice modulator using a hemicylindrical crystal.

BACKGROUND OF THE INVENTION

Ink jet printers include an ink jet modulator which projects charged ink droplets that are deflected to form an information pattern on a moving document. Examples of multi-orifice printers may be found in U.S. Pat. Nos. 3,373,437, 3,714,928 and 3,739,395. Ink modulators associated with ink printers normally have been electromechanically tuned at a particular drop rate. Any deviation in the operation from the resonant frequency has been accompanied by a deterioration in the modulator efficiency resulting in intolerable changes in the distance between the nozzle and the droplet break-off point. Variation in the distance of the break-off point from the nozzle affects the drop charging function which may result in poor quality printing. Prior modulator systems have been characterized by an acute sensitivity to temperature changes, and have a propensity for generating satellite droplets about the primary ink jet stream due to a shift in the resonant frequency of the crystal.

When the transport velocity changes, it is necessary to provide a corresponding change in the drop rate. Typical prior art ink jet printers operate at a single frequency and are used on equipment utilizing a single speed. Changes in drop rate to accommodate a change in transport speed has been reflected by a degradation of printing quality.

In the development of some multiple nozzle configurations, complex systems having plural transducer-diaphragm combinations have been required. U.S. Pat. No. 3,708,798 discloses a multi-nozzle printer having a plurality of piezoelectric transducers secured to a like plurality of diaphragms which pulsate the ink towards a set of nozzles. In U.S. Pat. No. 3,900,162 an ink gun comprised of a diamond-shaped ink chamber feeds multiple orifices to form droplets at approximately the same time and at a near uniform distance from the orifices. The diamond shaped chamber is divided along its diagonal by a vibrating member and has a plurality of transducers affixed to one side of the member.

SUMMARY OF THE INVENTION

In the present invention, a wideband ink jet modulator having a multiple orifice plate is provided which has reliable operating characteristics over a wideband of drop frequencies. For the operational range, the occurrence of satellite droplets may be substantially eliminated and changes in temperature, and drop rates may be accommodated without decreasing the quality of the print. The plural orifices may be serviced without sacrificing either the simplicity of construction or the efficient operation of the modulator.

Herein is disclosed a multi-orifice ink jet modulator utilizing a hemicylindrical transducer which has many advantages over prior devices due to its being able to perform at any given frequency within its range of operation and perform while the frequency is being changed. The hemicylindrical crystal is backed by materials which damp and attenuate unwanted resonances and reflections at all frequencies within its operating range. All streams are modulated simultaneously. Operating at a changing frequency will permit printing on a transport that has a changing speed or while it is starting and stopping. It is possible to build an assembly to print from a few drops to a full page width of drops with separate chargers for each orifice and it can be used to print bars or characters while using a common deflection field. The gun has a built-in quick purge system for faster turn on/turn off. It has more power applied to the fluid because a hemicylinder has a much greater radiating area for the same frontal area than the conventional flat crystal. The nozzle plate may be of any material in which nozzles can be formed and is hard and strong enough to support the pressure applied at the orifice area.

DESCRIPTION OF THE DRAWINGS

A more complete understanding of the present invention and the technical advances represented thereby may now be had by referring to the following description taken into conjunction with accompanying drawings in which:

Referring to FIG. 1, a hemicylindrical piezoelectric crystal 12 is embedded in an epoxy material 13 in a carrier base 11. The epoxy and teflon provide damping and attenuating as hereinafter explained. The base 11 may be for example, a teflon material having a recess therein to receive the electrical crystal. The crystal then is imbedded and held within the base 11 by the epoxy 13. The crystal has contact areas on both sides thereof (not illustrated) and contact is made thereto by the contact wires 22 and 23. These wires may be potted in the epoxy and brought through a portion thereof to make contact to the imbedded crystal. A gasket 21 fits down over the imbedded crystal and seals the ink chamber when the orifice plate 16 is positioned on top of a gasket. Front plate 17, orifice plate and gasket are held in position against base 11 by assembly screws 18.

The orifice plate illustrated has eight orifices 19 therein, however, depending on the desired purpose and utilization of the printer, quantities other than eight may be used.

In one embodiment, one half of a cylindrical crystal was used. The crystal was, for example, the type manufactured by Vernitron, Piezoelectric Division of Bedford, Ohio and designated as PZT-5H type material. Such material has a mechanical Q of approximately 65 and a high "strain per field at constant stress factor" ($D_{33}$) of $593 \times 10^{-12}$ meters per volt. One half of a cylinder one half inch in diameter and one half inch long was used. The wall thickness was one-thirty second inch thick.

The orifice plate has eight orifices therein. A plate with as many orifices as desired may be used and the holes may be placed close together so long as the ink droplets in flight do not interfere one with the other. The plate may be, for example, of stainless steel.

Figure 1:
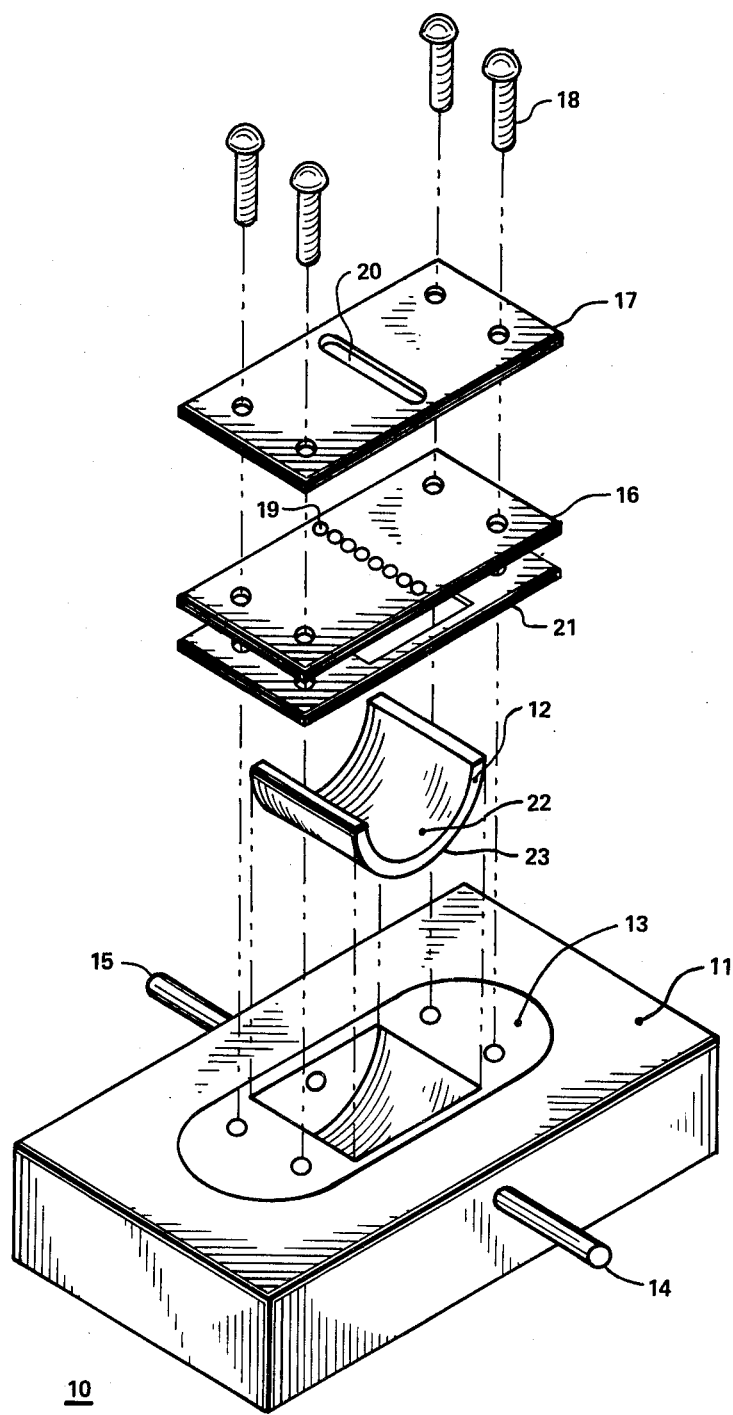
FIG. 1 is an exploded view of the multi-orifice gun.
Figure 2:
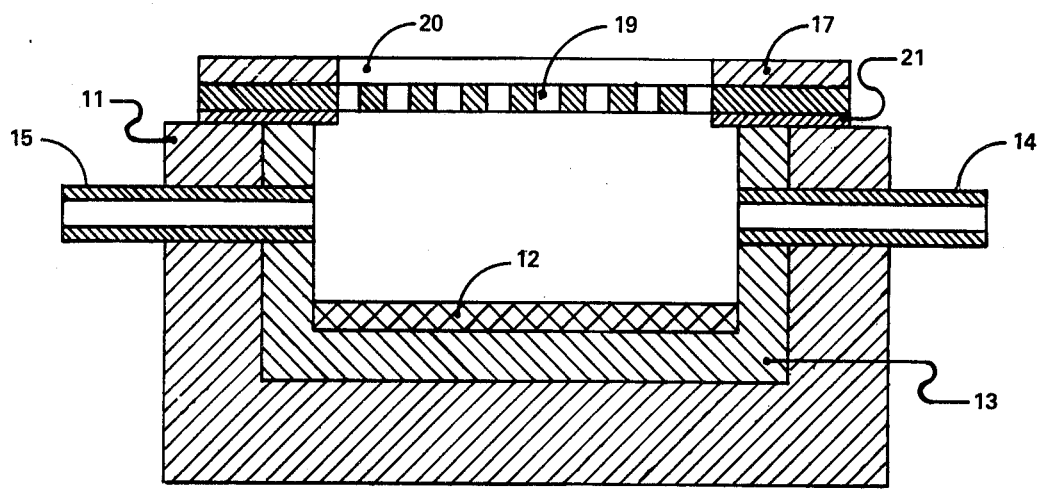
FIG. 2 is a cross sectional plan view of the assembled gun.

In FIG. 2 is a plan view of the assembled gun showing the base 11 having the crystal 12 imbedded therein and held in place by the epoxy 13. Tubes 14 and 15 are used to supply ink to the gun and for purging the cavity. Gasket 21 resides on the top of the base 11 and across the ends of cylinder 12 sealing the ink chamber along the edges thereof.

In operation, ink under pressure flows through the tube 14 and the orifices 19. Initially tube 15 is opened to purge any solvent residue which may be present in the ink cavity. Thereafter, tube 15 is closed off and ink exits only through the nozzle orifice 19. Voltage pulses are applied to the leads 22 and 23 (not shown in FIG. 2) to cause crystal 12 to expand and contract between the electrodes. The ink within the reservoir thereby is pressure modulated. The pressure wave is transmitted through the nozzles 19 down the ink stream, causing the ink stream to break into droplets at the rate modulated.

Figure 4:
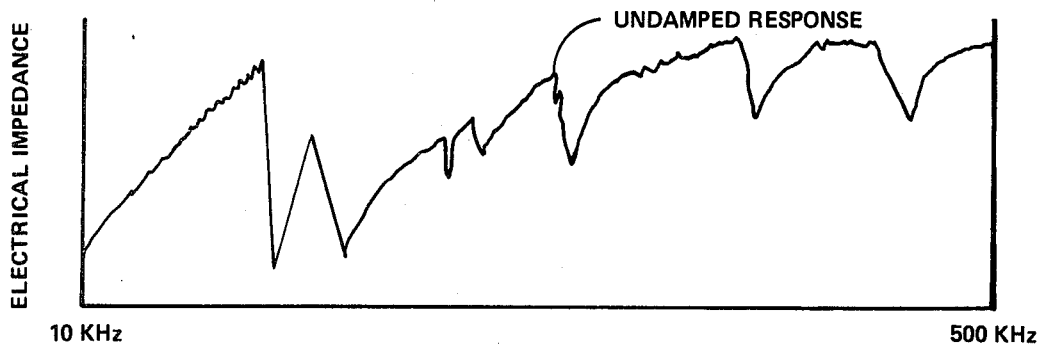
FIG. 4 is a graph of the piezoelectric cyrstal impedance plotted against frequency.
Figure 5:
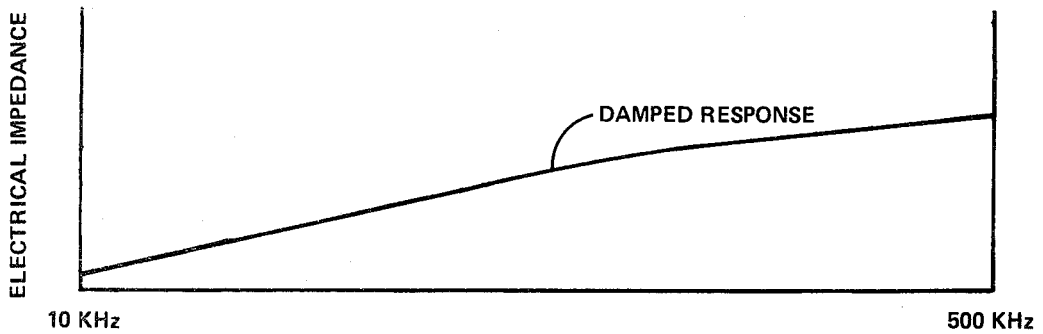
FIG. 5 is the impedance plotted against frequency when crystal is damped by embedding the crystal as illustrated in FIG. 2.

The physical dimensions of the crystal are smaller than one-half wavelength of the shortest standing acoustical wave that is produced at the highest drop rates. The epoxy potting and the teflon carrier damp and attenuate unwanted resonances and reflections which cause changes in efficiency with changes in frequency. Impedance of the crystal plotted against frequency is illustrated in FIG. 4 for the crystal when tested alone. FIG. 5 is a plot of the crystal impedance when the crystal is damped and attenuated by plotting it in epoxy in the teflon base. A wide bandwidth of drop rate frequencies is thereby provided which is far enough below any undamped mechanical resonance frequency of the modulator to be effectively isolated from the effects of both the resonant frequency and the harmonic thereof which may be excited during a printing operation. As a result, the ink droplet breakoff distance is substantially uniform over the operating range and the tolerance of the modulator to drop rate and temperature, is improved.

Figure 3:
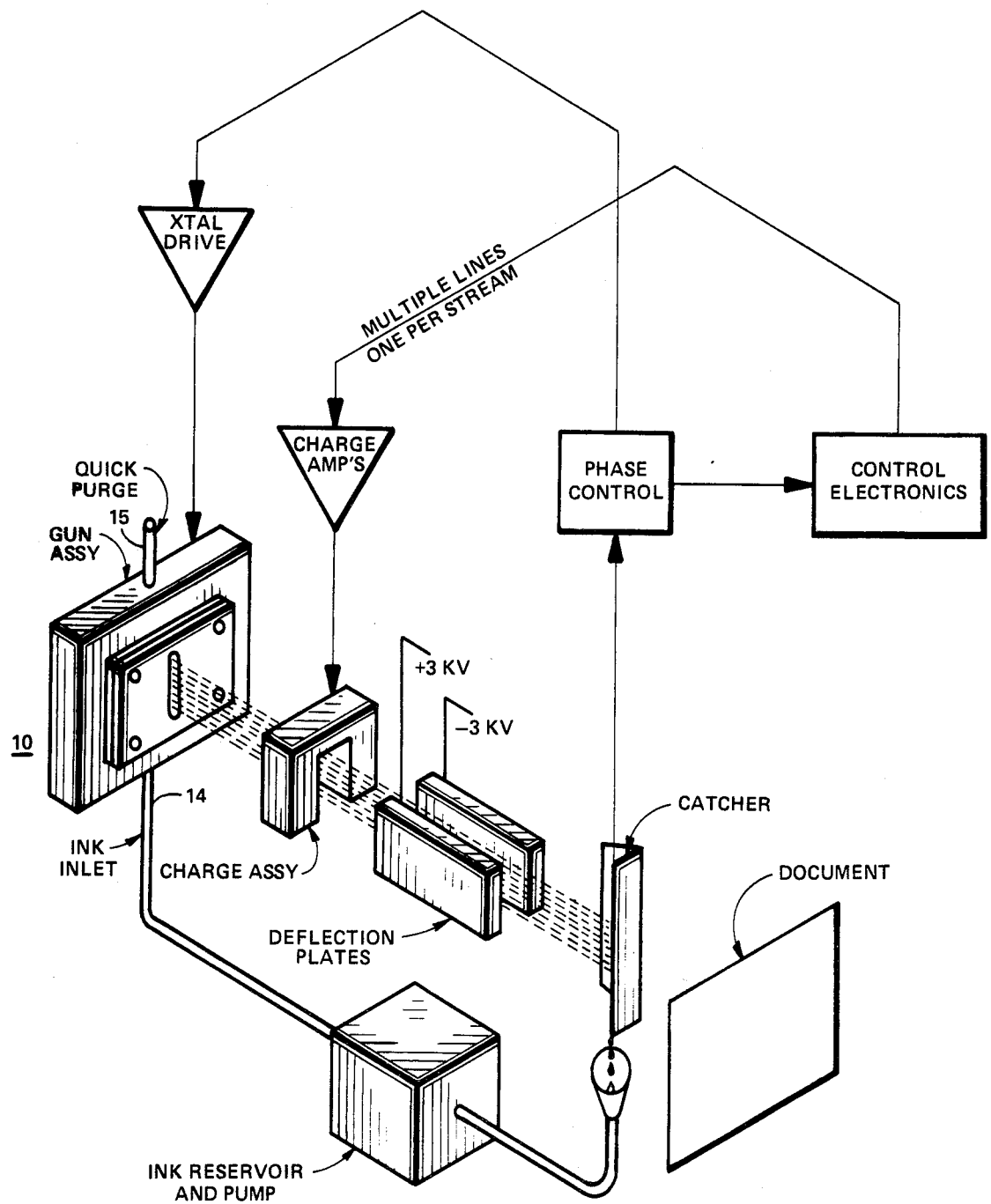
FIG. 3 is a typical system in which the gun may be used.

To illustrate the use of the gun, a typical system is illustrated in FIG. 3. In this system the crystal drive, which may be variable over the frequency operating range, drives the piezoelectric crystal. Ink introduced through 14 exits through the orifices and is directed through a charge assembly which causes each droplet to take on an electrical charge. The droplets may be individually charged by charge amplifiers, there being one charge amplifier per stream. Alternatively it will be possible to charge the droplets in all streams simultaneously with a single charge assembly. After passing through the charge assembly, the droplets go between deflection plates and to a catcher. When no document is in front of the ink gun, the drops are normally directed into the catcher where the ink drains back into an ink reservoir and pump assembly so it can be recycled through the system. Whenever a document is to be printed, the ink droplets are electrically charged and the deflection plates cause the ink droplets to deflect out of the catcher and onto the document. To compensate for variations in fluid parameters a phase control is provided which detects the charge on the catcher due to the charged ink droplets thereon. A phase control in conjunction with control electronics controls the crystal drive and the charge which is applied to each of the droplets. A control system such as illustrated here is disclosed and claimed in U.S. Pat. No. 3,596,276. Since multiple streams of ink are directed into the catcher, the phase control system would have to sequentially detect the phase of each ink stream in order to provide compensation for each ink stream independent of the other streams.

Having described the invention in connection with certain specific embodiments thereof, it is to be understood that further modification may now suggest themselves to those skilled in the art. It is the intent of the above description to cover such modifications as fall within the scope of the appended claims.

What is claimed:

1. A wide band multi-orifice variable frequency modulator for an ink jet printer comprising a hemicylindrical transducer, a solid wave damping material backing said transducer to attenuate unwanted resonance peaks over the frequency range of operation, a base member having a recess in which the wave damping material and transducer resides, and a nozzle plate closing the transducer such that each of the orifices is equidistant from the hemicylindrical transducer.

2. The modulator according to claim 1 wherein to provide variable frequency operation the physical dimensions of the transducer are smaller than half the wavelength than of the shortest standing acoustical wave that can be established at the highest of the operable drop frequency rates.

* * * * *